US006427304B2

(12) United States Patent
Kaibach et al.

(10) Patent No.: US 6,427,304 B2
(45) Date of Patent: Aug. 6, 2002

(54) DEVICE FOR REMOVING FORMLOCKINGLY ANCHORED DOWELS

(75) Inventors: Werner Kaibach, Buchloe; Stefan Raber, Kaufering; Hans-Jürgen Negele, Denklingen, all of (DE)

(73) Assignee: Hilti Aktiengesellschaft, Schaan (LU)

( * ) Notice: Subject to any disclaimer, the term of this patent is extended or adjusted under 35 U.S.C. 154(b) by 0 days.

(21) Appl. No.: 09/837,689

(22) Filed: Apr. 18, 2001

Related U.S. Application Data

(63) Continuation-in-part of application No. 09/614,039, filed on Jul. 11, 2000, now abandoned.

(30) Foreign Application Priority Data

Jul. 14, 1999 (DE) ........................................ 199 32 863

(51) Int. Cl.[7] ................................................ B23P 19/04
(52) U.S. Cl. .............................. 29/263; 29/280; 29/282
(58) Field of Search .......................... 29/263, 255, 280, 29/282, 272

(56) References Cited

U.S. PATENT DOCUMENTS 3,750,500 A * 8/1973 Peterson ...................... 29/255
4,110,886 A * 9/1978 Wendeler et al. ............. 29/255
4,702,654 A * 10/1987 Frischmann et al. .......... 29/255
5,355,574 A * 10/1994 Zweekly et al. .............. 29/262

* cited by examiner

*Primary Examiner*—Joseph J. Hail, III
*Assistant Examiner*—Lee Wilson
(74) *Attorney, Agent, or Firm*—Sidley Austin Brown & Wood, LLP

(57) ABSTRACT

A device for removing formlockingly anchored dowels including an anchor rod and an expansion sleeve (31) displaceable along the anchor rod, the device including a sleeve-shaped support member (2) having, at one of its ends, a support shoulder, an indexing projection (4) extending beyond the support shoulder (3) and provided with a load application element (5) movable in a tensile operational engagement with the load application element (32) of the dowel sleeve (31); and a through-bore provided with an inner thread for receiving a shaft (7) having an outer thread (8) cooperating with the inner thread of the through-bore (6) to provide for a relative axial displacement of the shaft (7) with respect tot he support member upon rotation of the shaft (7), the shaft (7) having identical coupling elements (11) provided at its opposite longitudinal ends, and an adaptor (12) including an elongate section (13) having at its free end connection element (14) corresponding to the coupling element (11) of the shaft (7) and having, at its end opposite the elongate section (13), a shank (15) receivable in a chuck of a hand-held tool.

7 Claims, 4 Drawing Sheets

DEVICE FOR REMOVING FORMLOCKINGLY ANCHORED DOWELS

RELATED APPLICATIONS

This application is a continuation-in-part of application Ser. No. 09/614,039, filed Jul. 11, 2000 now abandoned.

BACKGROUND OF THE INVENTION

1. Field of the Invention

The present invention relates to a device for removing dowel formlockingly anchored in a bore and including an anchor rod having a head portion widening toward a free end of the anchor rod, and a sleeve having radially expandable expansion tabs at its one end and having a load application element at its other opposite end. Here, "formlockingly", a term used in the art, indicates a positive engagement of elements of the dowel in complementary shaped recesses or grooves formed in the bore in which the dowel is anchored.

2. Description of the Prior Act

For a heavy load anchoring, in particular, for achieving a reliable attachment, often, formlockingly anchorable dowel systems are used. A main element of such dowel system is an undercut self-cutting dowel which is anchored in a bore, while forming an undercut during the setting or anchoring process. Also, dowels can be used which engage an undercut preliminary formed in the bore in which the dowel is to be anchored. A conventional dowel has, as a rule, an anchor rod with a head portion which widens toward the free end of the anchor rod. A sleeve having an expansion region is axially displaceable along the anchor rod. The expansion region of the sleeve is formed of a plurality of expansion tabs separated from each other by longitudinal slots. The expansion tabs expand upon displacement of the sleeve over the conical head of the anchor rod. In the undercut self-cutting dowels, cutting bodies are provided on the outer surfaces of the expansion tabs and which, upon rotation of the sleeve during the sleeve displacement over the conical head, form an undercut in the bore wall. Such an undercut self-cutting dowel is disclosed, e.g., in U.S. Pat. No. 4,702,654.

In constructional works, it is often necessary, after a removal of an attached constructional part, to completely removed the formlockingly anchored dowel. With existing undercut self-cutting dowels, this is, as a rule, not possible or, even if possible, is associated with substantial expenses. Often, only the anchor rod is separated at the bore mouth, and the bore is closed. The dowel, which remained in the bore, can present problems during a subsequent attachment of another constructional element. Because of the difficulties associated with the removal of the dowels, the inspection of the attachment points is also associated with substantial difficulties. When undercut self-cutting anchors are used, it can happen that an anchoring process cannot be completed because the expansion tabs encount a reinforcing metal. In this case, a partially anchored dowel need be removed. As it has already been discussed above, this is associated with substantial expenses, and often satisfactory results cannot be obtained.

Accordingly, an object of the present invention is to provide a device for completely removing a partially or completely anchored dowel.

Another object of the present invention is to provide a dowel-removing device having a robust structure and which is easy to use

SUMMARY OF THE INVENTION

These and other objects of the present invention, which will become apparent hereinafter, are achieved by providing a dowel-removing device including a sleeve-shaped support member having, at its one end a support shoulder, an indexing projection extending beyond the support shoulder and provided with a load application element movable in a tensile operational engagement with the load application element of the dowel sleeve. A through-bore extends through the support sleeve including the indexing projection and is provided, at least regionwise, with an inner thread. A shaft is received in the through-bore. The shaft has an outer thread which cooperates with the inner thread of the through-bore to provide for a relative axial displacement of the shaft with respect tot he support member upon notation of the shaft. The shaft has, at its opposite longitudinal ends, identical coupling elements. The device further includes an adaptor including an elongate sector having at its free end a connection element corresponding to the coupling element of the shaft and a diameter smaller than an inner diameter of the through-bore of the support sleeve. The adaptor has, at its ends opposite the elongate section, a shank receivable in a chuck of a hand-held tool.

The inventive dowel-removing device insures a complete, simple, and reliable removal of a partially or completely anchored undercut-engaging dowel which can be formed either as a conventional dowel engaging a preliminary formed undercut or as an undercut self-cuffing dowel which forms an undercut upon being anchored. The shaft, which cooperates with the inner thread provided in the support member bore, is easily adjusted with respect to the support member. The adaptor serves for transmitting of a rotational movement from a hand-held tool to the shaft. The adaptor can be coupled alternatively to one or another end of the shaft. For removal of the dowel, the indexing projection is so connected with the rear end of the dowel sleeve that it remains unaffected by the tensile forces.

The support member is supported, in the region of the bore mouth, either against a constructional part or against a constructional component. During the withdrawal of the dowel, the adaptor is connected with the shaft end remote from the indexing projection. Upon rotation of the shaft about its longitudinal axis, it displaces relative to the support member, until it abuts the end surface of the dowel anchor rod. Upon further rotation of the shaft, a pulling force is applied to the dowel sleeve, whereby the sleeve is pulled out from the bore. After lifting of the dowel-removing device, the anchor rod can be withdrawn from the bore. Thereafter, the adaptor is connected with the another end of the shaft, with the shaft being returned to its initial position upon its rotation. It is advantageous, from the manufacturing point of view when the coupling elements, which are provided at the opposite longitudinal ends of the shaft, are formed as pegs having a non-circular cross-section. Then the connection element, which is provided at the free end of the adaptor, is formed as a blind bore having a cross-section corresponding to the cross-section of the peg. A particularly simple and tested geometry of the connection is provided when both the pegs and the blind bore have a hexagonal cross-section.

According to a preferred embodiment of the present invention, the adaptor is provided with an annual band which separates the elongate section of the adaptor from a section provided with the shank. The outer diameter of the band is larger than the inner diameter of the through-bore formed in the support member. The band prevents, upon withdrawal of the shaft, any contact between the drill chuck and the load application element provided on the indexing projection. This prevent any damage of the chuck and/or the load application element. Rather, as soon as the band contacts the indexing projection, automatic decoupling of the shaft from the adaptor takes place. The length of the elongate section, which includes the connection element cooperating with the shaft coupling element, is so selected that it corresponds to that of the support member, insuring return of the shaft to a position optimal for removing a dowel. Thereby, preliminary adjustment of the dowel-removing device for a subsequent removal is eliminated. Advantageously, the length of the elongate section from the band to its free end is selected within a range from about 20 mm to about 200 mm, preferably, from 30 mm to 130 mm.

According to a particularly advantageous embodiment of the present invention, the load application element provided on the indexing projection includes radially projecting pins which formlockingly engage correspondingly formed undercut recesses at the rear end of the dowel sleeve. The selected geometry of the load application element on the indexing projection is robust, is easily formed, and makes the load application element easily engageable with the corresponding load application element at the rear end of the dowel sleeve.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
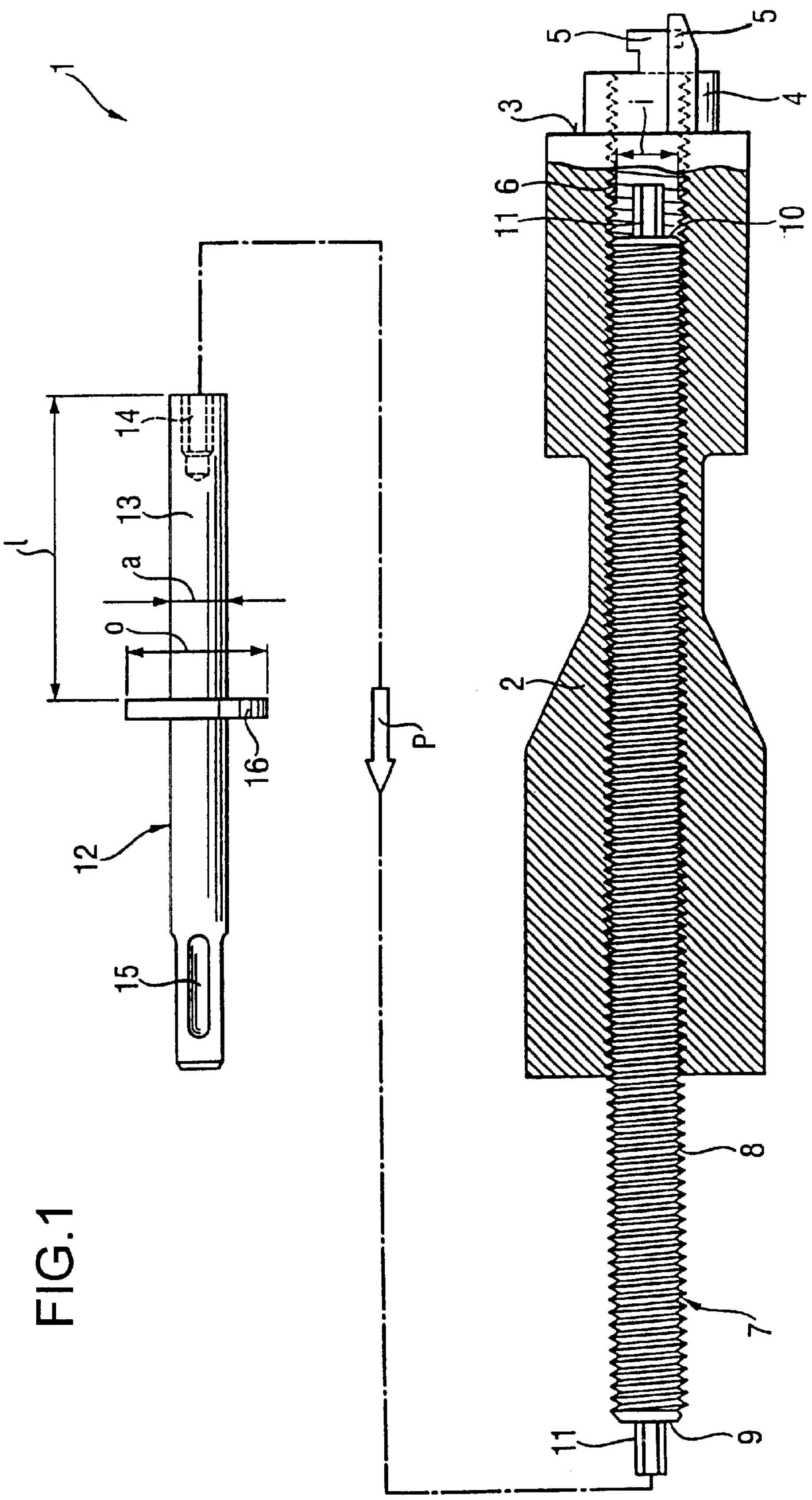
FIG. 1 a side partially cross-sectional view of a dowel-removing device according to the present invention in its initial position.

A dowel-removing device according to the present invention, which is shown in FIGS. 1–5 in different positions, is designated generally with a reference numeral 1. It includes a sleeve-shaped support member 2 which in order to provide for improved handling and reduced weight, can be shaped as, e.g., a dumbbell. One of the end surfaces of the support member 2 forms an annular support shoulder 3. An indexing projection 4 extend from the annular support shoulder 3. The indexing projection has two more load application elements formed, preferably, as radial pins 5. A through-bore 6 extends over an entire axial length of the sleeve-shaped support member 2 and into the indexing projection 4. The through-bore 6 has an inner diameter i and, at least regionwise, is provided with an inner thread. However, preferably, the inner through-bore 6 is provided with an inner thread along its entire length. The through-bore 6 serves for receiving a shaft 7 having an outer thread 8 along its entire length. The outer thread 8 of the shaft 7 cooperates with the inner thread of the through-bore 6 which permits to adjust the axial position of the shaft 7 relative to the support member 2 by rotating the shaft 7. The shaft 7 has, at its opposite ends 9 and 10, identically formed coupling elements 11 formed, e.g., as a journal having a hexagonal cross-section. The shaft 7 is screwed into the through-bore 6 of the support member 2 in any arbitrary position. The coupling elements 11 are pinned to a connection element 14 of an adaptor 12. The connection element 14 can be formed, e.g., as a blind bore having a hexagonal cross-section which corresponds to the cross-section of the coupling elements 11 provided at the opposite ends 9 and 10 of the shaft 7. The section 13 of the adaptor 12 in which the connection bore 14 is formed, has, preferably, an outer diameter a which is smaller than the inner diameter i of the through-bore (6) of the support member 2. Thereby, the section 13 can be inserted into the through-bore 6 during a dowel removal process. An annular band 16 separates the front section 13 of the adaptor 12 from the adaptor rear section which is formed as a shank 15 to be received in a chuck of a drill. The annular band 16 has an outer diameter o which is larger than the inner diameter i of the through-bore 6 of the support member 2. The length I of the front section 12 amounts form about 20 mm to about 200 mm, preferably, from 30 mm to 130 mm.

Figure 2:
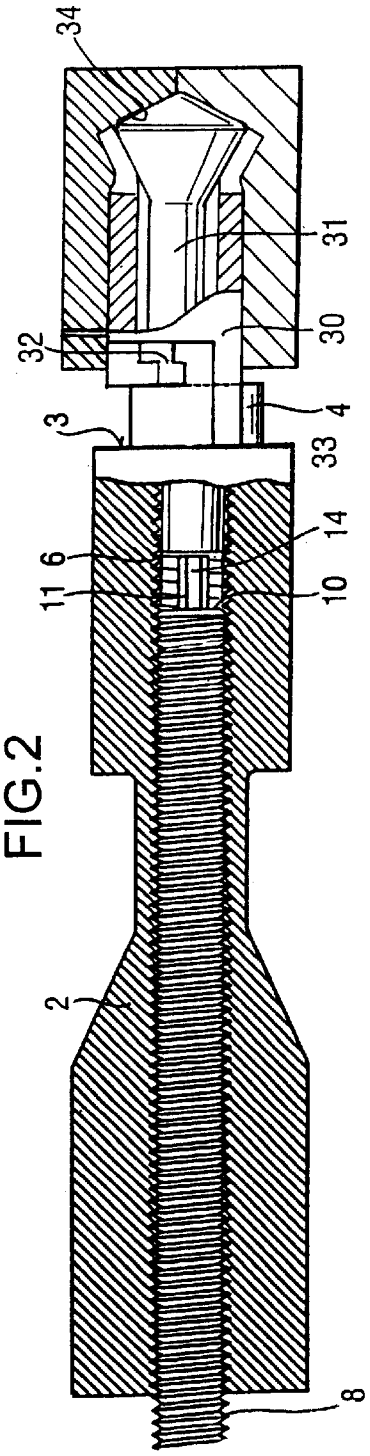
FIG. 2 a partial side cross-sectional view of the device shown in FIG. 1 in a dowel-engaging position.
Figure 3:
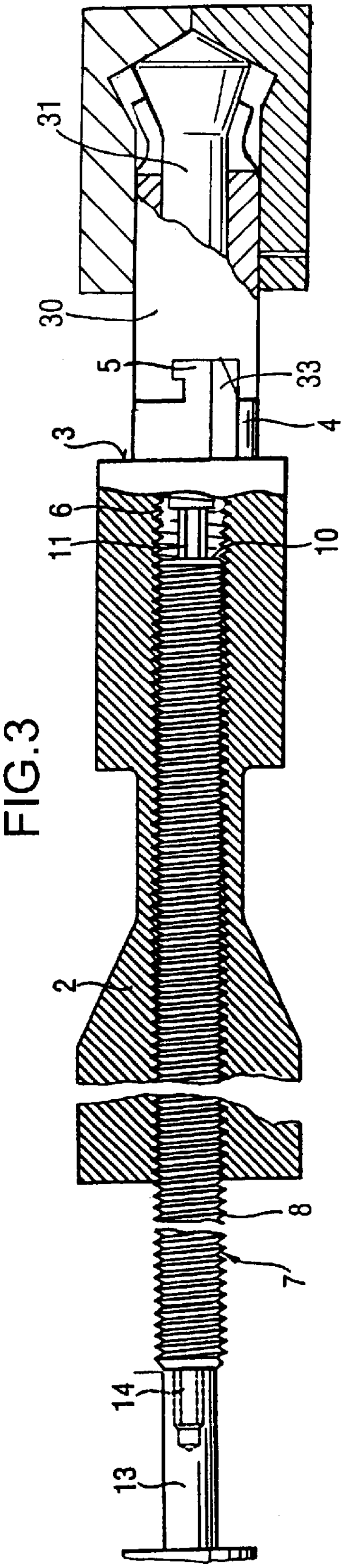
FIG. 3 a partial side cross-sectional view of the device shown in FIGS. 1–2 in a dowel-removing position.

FIG. 2 shows the dowel-removing device 1 in its dowel-engaging position in which the load application element 5 at the end of the bar-shaped projection 4 engages the corresponding load application element 32 on the sleeve 30 of the removable undercut-engaging dowel 31 which is located in a bore of a constructional component. The adaptor 12 has its connection element 14 pinned on the coupling element 11. The connection of the adaptor 12 (not shown in FIG. 2) with the shaft 7 is indicated by arrow P in FIG. 1. The shank 15 of the adaptor 12 is secured in a chuck of a drill. To prevent disengagement of the dowel-removing tool 1 and the sleeve 30, a wedge member 33 is used. The rotation of the drill results in the shaft 7 being further screwed into the through-bore 6 until the coupling element 11 at the front end 10 of the shaft 7 engages the anchor rod of the undercut self-cutting dowel which projects from the bore. By the shaft 7 being further screwed in, the support member 2 applies a pulling force to the sleeve 30 of the undercut self-cutting dowel 31. As a result, the sleeve 30 is pulled out of the bore, as shown in FIG. 3.

Figure 4:
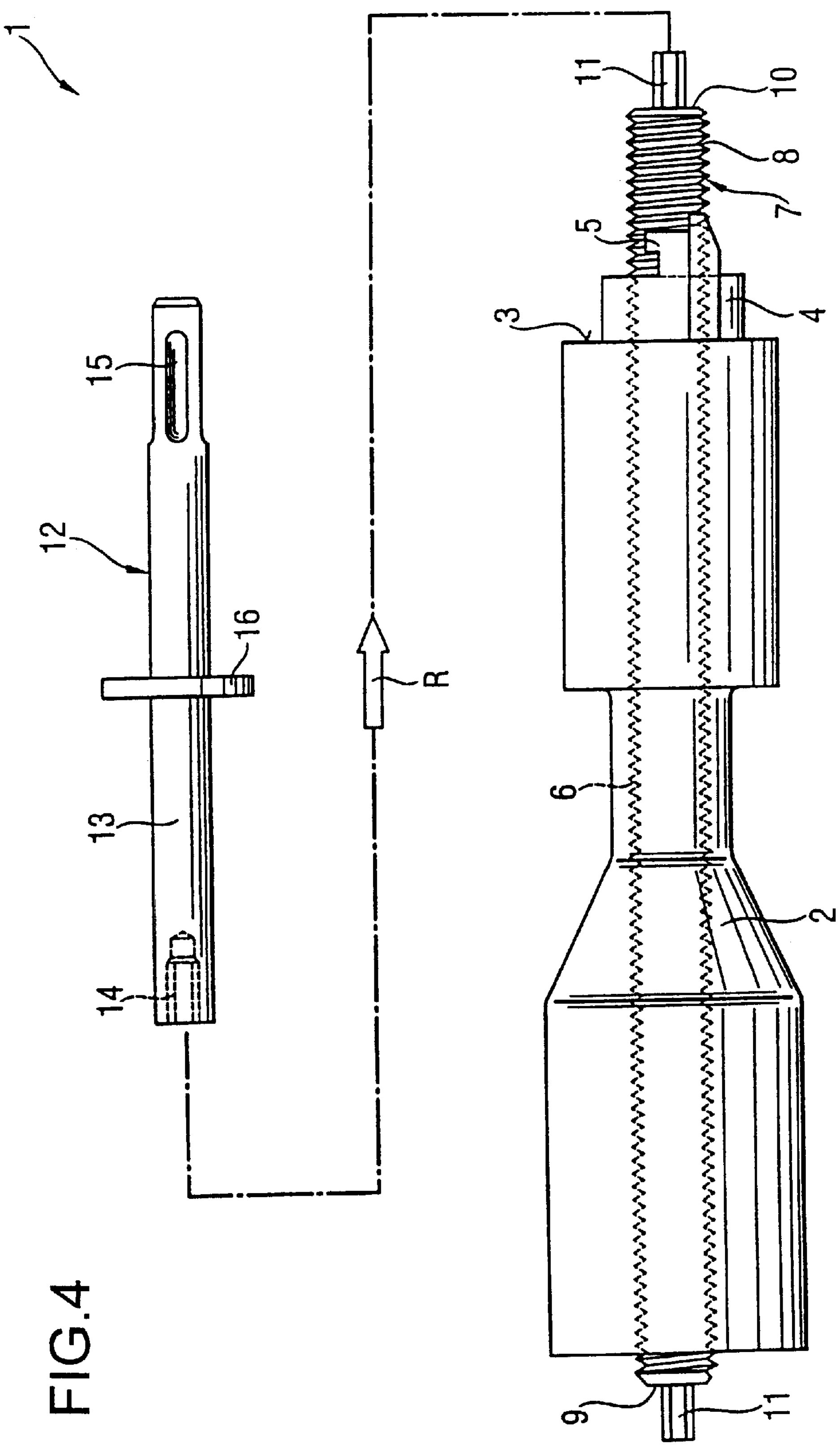
FIG. 4 a side view of the device shown in FIGS. 1–3 after the dowel has been removed.

FIG. 4 shows the dowel-removing device 1 immediately after the removal of the dowel sleeve. The shaft 7 is completely screwed into the support member 2. The front end 10 of the shaft 7 projects beyond the indexing projection 4. To screw the shaft 7 out of the support member 2, the coupling member 11 at the front end 10 of the shaft 7 is inserted into the blind bore 14 of the adaptor 12, the shank 15 of which is again secured in the drill chuck. The connection of the adaptor 12 with the shaft 7 in FIG. 4 is again shown with arrow R. The shaft 7 is screwed out of the support member 2 by the rotation of the drill.

Figure 5:
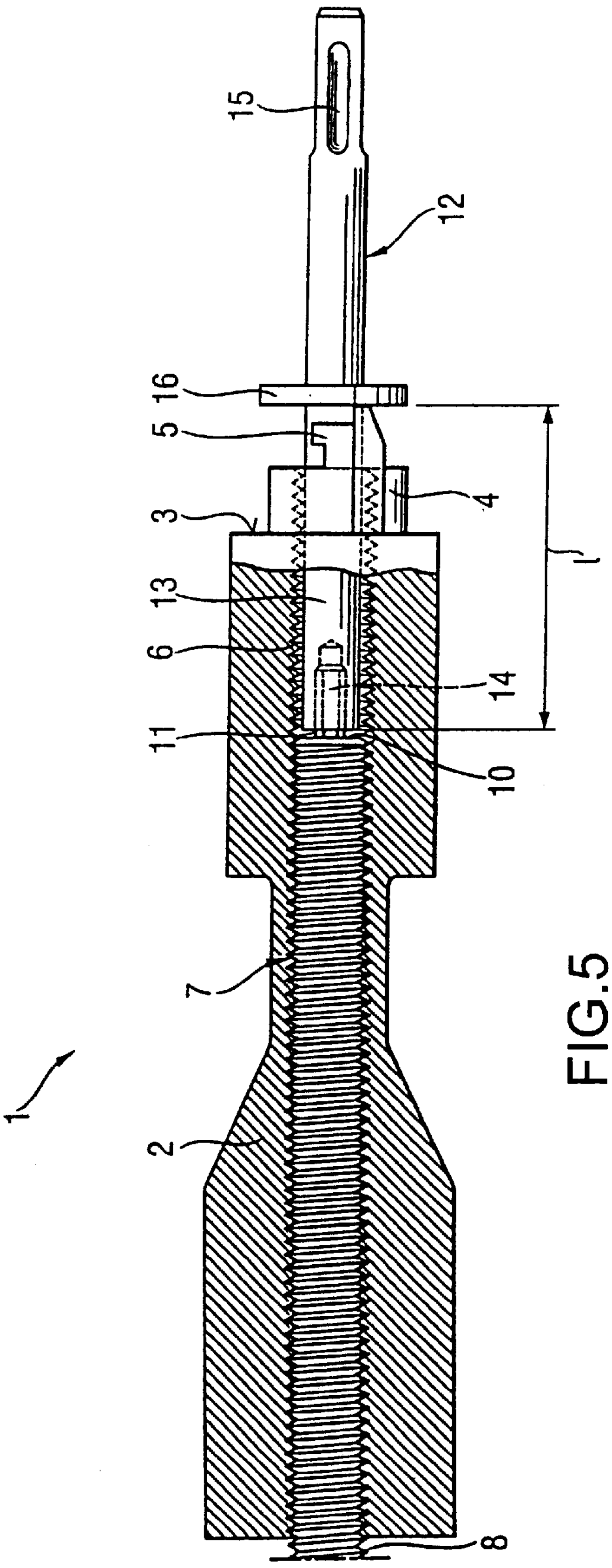
FIG. 5 a side view of the device shown in FIGS. 1–4 in a position immediately preceding the initial position.

FIG. 5 shows a position of the dowel-removing device 1 immediately before shaft 7 reaches its initial position. The annular band 16 of the adaptor 12 is located in the vicinity of the load application element 5 on the indexing projection 4. Upon further rotation of the shaft 7, the band 16 contacts the indexing projection 4. As a result, the coupling element 11 at the front end 10 of the shaft 7 automatically comes out of the blind bore 14, and the rotation of the adaptor 12 is not transmitted any more to the shaft 7.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A device for removing formlockingly anchored dowels including an anchor rod having a head portion widening toward a free end of the anchor rod, and a sleeve having radially expandable expansion tabs at one end thereof and having load application means at another opposite end thereof, the device comprising a sleeve-shaped support member (2) having, at one end thereof, a support shoulder (3), an indexing projection (4) extending beyond the support shoulder (3) and provided with load application means (5) movable in a tensile operational engagement with the load application means of the dowel sleeve, and a through-bore extending through the support member (2) including the indexing projection (4) and provided at least regionwise with an inner thread; a shaft (7) received in the through-bore (6) and having an outer thread (8) cooperating with the inner thread of the through-bore (6) to provide for a relative axial displacement of the shaft (7) with respect to the support member upon rotation of the shaft (7), the shaft (7) having identical coupling means (11) provided at opposite longitudinal ends thereof, and an adaptor (12) including an elongate section (13) having at a free end thereof connection means (14) corresponding to the coupling means (11) of the shaft (7) and a diameter (a) smaller than an inner diameter (i) of the through-bore (6) of the support sleeve (2), the adaptor (12) having a shank (15) receivable in a chuck of a hand-held tool and located at an adaptor end opposite the elongate section (13).

2. A dowel-removing device according to claim 1, wherein the coupling means (11), which is provided at the opposite longitudinal ends of the shaft (7), is formed as a peg having a non-circular cross-section, and wherein the connection means (14), which is provided at the free end of the adaptor (12), is formed as a blind bore having a cross-section corresponding to the cross-section of the peg.

3. A dowel-removing device according to claim 2, wherein both the peg and the blind bore have a hexagonal cross-section.

4. A dowel-removing device according to claim 1, wherein the adaptor has an annular band (16) separating the elongate section (13) from a section provided with the shank (15), and the separating band (16) having a diameter (6) exceeding the inner diameter (i) of the through-bore (6) of the support member (2).

5. A dowel-removing device according to claim 4, wherein the elongate section (13) of the adaptor (12) has a length (1) amounting to from about 20 mm to about 200 mm.

6. A dowel-removing device according to claim 5, wherein the elongate section (13) has a length (1) from 30 mm to 130 mm.

7. A dowel-removing device according to claim 1, wherein the load application means (5) provided on the indexing projection (4) of the support member (2) comprises radially projecting pins formlockingly engageable in correspondingly formed undercut recesses provided at the another end of the dowel sleeve.

* * * * *